United States Patent [19]

Pletcher

[11] 4,059,715

[45] Nov. 22, 1977

[54] ADHESIVE COMPOSITION AND SHEET-LIKE PRODUCT FORMED THEREWITH

[75] Inventor: Wayne A. Pletcher, Roseville, Minn.

[73] Assignee: Minnesota Mining and Manufacturing Company, St. Paul, Minn.

[21] Appl. No.: 699,976

[22] Filed: June 25, 1976

Related U.S. Application Data

[63] Continuation-in-part of Ser. No. 591,935, June 30, 1975, abandoned.

[51] Int. Cl.$^2$ .................................................. C09J 7/02
[52] U.S. Cl. .................................. 428/349; 156/235; 156/332; 156/249; 260/22 A; 260/860; 260/75 R; 427/207 A; 427/385 R; 428/40; 428/480; 428/355; 428/906
[58] Field of Search ............... 156/230, 306, 235, 309, 156/249, 320, 332; 427/207 A, 385 R, 374 C, 398 R, 375, 407 R; 428/40, 480, 349, 355, 906; 260/22 A, 75 R, 860

[56] References Cited

U.S. PATENT DOCUMENTS

| | | | |
|---|---|---|---|
| 2,191,704 | 2/1940 | Bennett | 156/230 |
| 2,495,761 | 1/1950 | Platt | 156/309 |
| 2,653,881 | 9/1953 | Vetter | 428/355 |
| 2,708,650 | 5/1955 | Pullman et al. | 156/332 |
| 3,013,914 | 12/1961 | Willard | 156/332 |
| 3,311,578 | 3/1967 | Laakso | 260/22 A |
| 3,390,108 | 6/1968 | Keck et al. | 260/22 A |
| 3,483,020 | 12/1969 | Giellerup | 428/349 |
| 3,775,375 | 11/1973 | Wolfe | 260/75 R |
| 3,784,520 | 1/1974 | Hoeschele | 260/75 R |
| 3,853,665 | 12/1974 | Gardziella | 156/332 |

*Primary Examiner*—Charles E. Van Horn
*Assistant Examiner*—J. J. Gallagher
*Attorney, Agent, or Firm*—Cruzan Alexander; Donald M. Sell; Donald C. Gipple

[57] ABSTRACT

A method for forming a strong bond between a substrate and a solid thermoplastic polymer which comprises melting a thermoplastic polymer having an effective open time (a period after melting the polymer during which it remains aggressively tacky and bondable below the melting temperature), cooling it below the melting temperature, contacting the open polymer with a substrate and allowing the polymer to revert to its non-bondable, solid state. Also disclosed are a class of copolyesters suitable for use in the method and certain novel articles adapted for carrying out the method.

34 Claims, No Drawings

ADHESIVE COMPOSITION AND SHEET-LIKE PRODUCT FORMED THEREWITH

CROSS REFERENCE TO RELATED APPLICATIONS

This is a continuation-in-part of application Ser. No. 591,935, filed June 30, 1975, now abandoned.

Certain of the copolyesters which are a part of the present invention are utilized as binders in magnetic recording media which are the subject of an application of Wayne A. Pletcher and Russell L. Vermillion, application Ser. No. 591,936, also filed June 30, 1975, now U.S. Pat. No. 4,025,694. The disclosure of that application is incorporated herein by reference.

FIELD OF THE INVENTION

This invention concerns a method for forming a strong adhesive bond by means of a solid, thermoplastic polymer. The invention also concerns a class of segmented copolyesters by which the method of the invention can be practiced and certain novel articles adapted for carrying out the method.

BACKGROUND OF THE INVENTION

Adhesives are ordinarily classified as thermosetting adhesives (permanently setting adhesives which are initially fusible or bondable but crosslink into a permanently infusible state), thermoplastic or hot melt adhesives (re-bondable adhesives which move from a bondable melt to a non-bondable or set state when cooled below their melting temperatures without crosslinking and becoming infusible) or pressure-sensitive adhesives which remain tacky (bondable) at ordinary room temperatures.

Thermosetting adhesives ordinarily develop high bond strengths but require relatively extensive periods of time, heat cycles and/or the elimination of volatiles to bond. Hot melt adhesives also can develop relatively high bond strengths, but require heat cycles to bond. Pressure sensitive adhesives are easily used but ordinarily develop considerably lower bond strengths than do adhesives of the other types. Furthermore, unlike the others, pressure sensitive adhesives tend to fail after a period of time under continuous load.

Despite the variety of adhesives which are available, there are a number of applications for which no really satisfactory bonding method is known. These include manufacturing operations involving bonding to certain plastics and electronic assemblies which are destroyed or ruined if subjected to high temperatures as well as bonding to substrates which are so massive that it is impractical to heat them, and where bonds obtained from pressure sensitive adhesives are of inadequate strength. Bonding accompanied by the elimination of volatiles is normally undesirable in such operations due to equipment, toxicity, fire, pollution, space and other considerations. Also, where surfaces to be adhered are relatively impervious, the escape of volatiles can result in blistering and poor adhesion. It would therefore be desirable to provide a technique by which strong dependable bonds could be formed without heating the substrate bonded and without involvement of volatiles.

THE PRESENT INVENTION

In accordance with this invention, a method is provided for forming a strong, dependable adhesive bond to a substrate without subjecting the substrate to high temperatures and without the involvement of volatiles which comprises:

1. melting a solid, relatively strong thermoplastic polymer (which is free of solvating agents, including solvents and plasticizers) having an open time of at least about ¼ minute at 20° C.,
2. cooling the polymer below its melting temperature,
3. bringing the polymer into contact with a substrate at a temperature below the polymer melting temperature and while the polymer is still open, and
4. maintaining the polymer and the substrate in contact until the polymer has reverted to its solid, non-bondable state.

Substrate surfaces can be bonded together by means of this process or strong, adherent coatings can be applied to substrates.

The present invention also relates to a novel class of segmented copolyesters by which the method of the invention can be advantageously practiced. These are solid, non-tacky, strongly cohesive, solvent-free thermoplastic polymers which are themselves not subject to cold flow and are non-blocking below their melting temperatures but which become aggressively tacky and bondable upon being melted. They consist essentially of from about 5 to 75 percent by weight of amorphous ester units and 95 to 25 percent by weight of crystallizable ester units joined through the ester linkages (the term "crystallizable" as used herein includes both crystalline ester units and units which are capable of becoming crystalline). The crystallizable ester units in the copolyesters are of the formula:

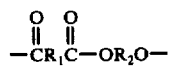

and the amorphous ester units are of the formula:

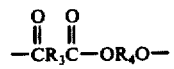

wherein $R_1$ consists of residues (remaining after removal of the carboxyl groups) of one or more diacids selected from saturated aliphatic dicarboxylic acids containing from 4 to 10 carbon atoms (the residues thereof containing from 2 to 8 carbon atoms) and aromatic dicarboxylic acids selected from terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid and 4,4'-diphenylamine dicarboxylic acid, $R_2$ consists of residues (remaining after removal of the hydroxyl groups) of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from 22 to 50 carbon atoms which remain after removal of the carboxyl groups from saturated aliphatic dimer acids (i.e. the polymerized and hydrogenated product of two molecules of an ethylenically unsaturated fatty acid containing from about 12 to 26 carbon atoms, the dimer acid thus being saturated and containing from 24 to 52 carbon atoms) and $R_6$ consists of the divalent radicals remaining after removal of the hydroxyl groups from a long chain aliphatic diol having an average molecular weight of 200 to 4000 (preferably 400 to 2000), provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight. The copolyesters have DTA melting temperatures of from about 25° to 150° C. and inherent viscosities of at least 0.5 dl/g (This and the other inherent viscosities herein are measured in 0.3 g/dl solutions of polymer in chloroform at 25° C.). Usually the inherent viscosities of the copolyesters are not more than 1.5 dl/g at 25° C. The open times of the copolyesters are at least about ¼ minute at 20° C. and ordinarily they are not more than about 1 hour at 20° C. For most adhesive and tape applications an open time of at least one-half minute is necessary and those copolyesters having open times of at least one-half minute are therefore a preferred class. The copolyesters are also substantially complete solubility in toluene at 25° C. in the ratio of about 10 percent by weight of copolyester and 90% by weight of solvent.

Preferably the copolyesters have melting points of at least 40° C., i.e. so that they are solids at ordinary temperatures, although in certain applications (e.g. where they are used as temporary binders in fugitive molds) polymers melting down to 25° C. are useful. For most adhesive, tape, permanent binder and coating applications, the polymers should have melting temperatures of from about 65° to 150° C. and such copolyesters form a particularly preferred class.

At the end of the open time a thermoplastic bond forms, i.e. a bond which is firmly set and of relatively high strength but capable of being broken by heating. Although the present invention is in no way affected thereby, it is believed that the phenomenon of the extended open time is due to a change in crystallinity which occurs in the polymer after an interval of time at the lower temperature, the interval depending upon the composition of the particular copolymer.

Small amounts of other materials which do not interfere with the polymerization reaction to form the segmented copolyester can be present. To enhance the open time and/or solubility of the copolyesters in which $R_1$ is entirely aromatic, they preferably contain at least 50 percent by weight of amorphous ester units. In any event, $R_1$, $R_2$, $R_3$, $R_4$ and any other building block should be selected such that the segmented copolyester has a differential thermal analysis (DTA) melting temperature of from about 25° to 150° C. (preferably 65° to 150° C.), an inherent viscosity of at least 0.5 dl/g, an open time of at least about ¼ minute at 20° C. and substantially complete solubility in toluene at 25° C. in the ratio of about 10 percent by weight of copolyester and 90% by weight of solvent.

The open time measurements herein are made by heating on a hot plate a 2.5 cm × 7.5 cm × 300 micron strip of the polymer to its melting point on a 2 mm glass plate (microscope slide), removing the glass plate from the hot plate and immediately placing it polymer side up on a heat insulating surface, such as a thick paper pad, at about 20° C. The open time is the elapsed time from placing the hot slide on the heat insulating surface until a paper strip placed in contact with the copolyester surface will no longer bond. The melting temperatures are determined by differential thermal analysis (DTA) and are taken at the peak of the maximum endotherm. They are measured in an atmosphere of helium at 740 mm. of mercury pressure at a temperature rise of 30° C./minute, the test ordinarily being run over the range of from about −140° to +200° C. The details of this method are described, for example, by C. B. Murphy in "Differential Thermal Analysis", R. C. Mackenzie, Editor, Volume I, pages 643 to 671, Academic Press, New York, 1970.

The copolyesters of the invention are substantially linear, of relatively high molecular weight and strength and they adhere well to a variety of substrates, including porous materials (such as wood, paper, etc.), glass and ceramics, metals (such as anodized aluminum), other polymers (such as polyesters, polycarbonates, vinyls and polystyrene), etc. They become bondable initially only when heated to or above the melt temperature, but have the remarkable property of remaining "open", i.e. bondable and tacky for a period of time ranging from a few seconds to many minutes after they have been cooled below the melting temperature and to ordinary (room) temperature, i.e. 20°–25° C. or even lower (the open time of any particular polymer depending largely upon its chemical composition). Furthermore, while the polymers are open they adhere strongly to substrates which are themselves at ordinary temperature (often far below the polymer melt temperature). This unusual property, in combination with the other properties of the polymers makes them uniquely useful as hot melt adhesives. They form strong, dependable bonds without the necessity of heating the substrates bonded and without involvement of volatiles. The initial bond strengths normally increase substantially for a period of time, up to several hours. Thus, the copolyesters of the invention are normally also characterized by:

1. tensile strengths of 100–400 kg/cm$^2$
2. elongations at break, of 400–1000 percent
3. T-peel adhesions to vinyl of at least 0.9 kg/cm of width
4. DTA glass transition temperatures, Tg, below −25° C.

Normally also they have acid values of 5 or less, this being a measure of the completeness of the linear polymerization reaction. The end groups of the polymers can be either carboxyls or hydroxyls (or simple derivatives thereof), depending upon the exact balance of the precursors charged in the polymerization reaction.

The tensile and elongation at break are measured by ASTM test method D 882, and the T-peel adhesion by ASTM test method D 1876-69 at a separation rate of about 30 cm/minute (the tensile, elongation and T-peel being run at room temperature: 20°–25° C.). The glass transition temperature (the temperature range at which an amorphous polymer changes from a brittle glassy state to a flexible rubbery state) is measured by differential thermal analysis by the procedure described previously relative to the melt temperature determination. The acid number is the number of milligrams of potassium hydroxide per gram of polymer required when titrating to bromothymal blue endpoint.

Normally and preferably the copolyesters contain only carbon, hydrogen and oxygen, although this is not necessarily the case.

The linear copolymers are prepared from short and long chain precursors which are difunctional with respect to carboxyl and hydroxyl, for example organic diols (glycols) and dicarboxylic acids. The diacid precursors containing $R_1$ are often referred to herein as short chain diacids, the diol precursors containing $R_2$ as short chain diols, the diacid precursors containing $R_5$ as long chain diacids and the diol precursors containing $R_6$ as long chain diols. The carboxyl and hydroxyl functions most often appear in the precursors as the free acid and free base but can also appear as simple derivative functions such as esters, acid chlorides or anhydrides if desired.

The relative amount of crystallizable and amorphous units is determined by the precursor charge. Most frequently the copolyesters are reaction products of a long and a short chain precursor of one functionality and a short chain precursor of the other functionality. In case of such a stoichiometrically balanced charge of three monomers, the weight percentages of amorphous and crystallizable units can be calculated exactly (this is also true where there are more then three monomers but of only three types, e.g., two short chain diacids, one short chain diol and one long chain diacid but no long chain diol, etc.). However, if monomers of all four types are included in the charge, the relative amounts of amorphous and crystallizable units are not exact but can be expressed as falling between two values (the range being quite narrow). Thus, to calculate the minimum amorphous content in such a copolyester, it is assumed that the maximum possible reaction occurs between the short chain diol and short chain diacid (thus maximizing the content of crystallizable units). To calculate the maximum amorphous content, it is assumed that the maximum possible reaction occurs first between the short chain diacid and the long chain diol and between the short chain diol and the long chain diacid, the remaining reactants after those reactions (if any remain) reacting with one another.

The amorphous and crystallizable units of the copolyesters can alternate in the polymer chains or they can appear in blocks of the same type and this can be controlled to some extent by the process of preparation. For example, prepolymers of crystallizable and/or amorphous units can be prepared separately thus assuring larger blocks of one type or the other or, as is the usual practice, the precursors (monomers) can be charged directly and simultaneously to the reaction vessel. It has been found, however, that these variations cause only very minor, if any, differences in the final polymers and that the products of the polymers are largely determined by the proportions and chemical natures of the individual crystallizable and amorphous units as defined previously and by the molecular weight of the linear polymer.

The amorphous blocks of the copolyesters of the invention are most often composed of alternating long chain diol and short chain diacid residues, but this is not necessarily the case. Although, as noted previously, it is possible that a long chain diol and a long chain diacid could react alternately to form blocks of several repeating units, this is unlikely and, at any rate would have little effect on the properties of the resulting polymer. The end groups of the copolyesters can be of a single functionality, if an excess of one precursor is included, or can be a mixture if the charge was stoichiometrically balanced.

The short chain diacids can be saturated aliphatic acids containing from 4 to 10 carbon atoms (including unbranched, branched, or cyclic having 5 or 6 atoms in a ring) and/or aromatic acids containing from 8 to 15 carbon atoms. Examples of suitable aliphatic acids are succinic, glutaric, adipic, pimelic, suberic, azelaic, sebacic, 1,4-cyclohexanedicarboxylic, 1,3-cyclopentanedicarboxylic, 2-methylsuccinic, 2-methylpentanedioic, 3-methylhexanedioic acids and the like. Suitable aromatic acids are terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid and 4,4'-diphenylamine dicarboxylic acid. Preferably $R_1$ (the structure between the carboxyl groups in these acids) contains only carbon and hydrogen. More preferably (for reasons of economics and availability of precursors) $R_1$ is phenylene.

The short chain diols include branched, unbranched, and cyclic aliphatic diols having 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'-ethanol),cyclohexane-1,4-dimethanol, 1,10-decanediol, and 1,12-dodecanediol. The preferred diols are 1,5-pentanediol and cyclohexane-1,4-dimethanol which may be a mixture of cis-trans isomers such as a mixture containing about 30% cis- and 70% trans-cyclohexane-1,4-dimethanol.

The chemical structure of the long chain diol is not critical. Any substituent groups which do not interfere with the polymerization reaction to form the copolyester can be present. Thus, the chain can be a single divalent acyclic or alicyclic, hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain diols used to prepare the copolyesters should be terminal groups to the extent possible.

Suitable long chain diols include poly(oxyalkylene)-glycols in which the alkylene group contains from 2 to 9 carbon atoms and preferably from 2 to 4 carbon atoms. Among these compounds are polyether glycols such as poly(oxyethylene)glycols having molecular weights of about 200, 600, 1500, and 2000, poly(oxypropylene)glycols, having molecular weights of about 425 and 1800, poly(oxytetramethylene)glycols for example having molecular weights of about 1000 and 2000, poly(oxypentamethylene) glycols, poly(oxyhexamethylene)glycols, poly(oxyheptamethylene)glycols, poly(oxyoctamethylene)glycols, poly(oxynonamethylene)glycols, and random or block copolymers thereof, for example glycols, derived from ethylene oxide and 1,2-propylene oxide. Also included are poly(-lactone)glycols, e.g. poly(caprolactone)glycol; poly(oxyalkylenecarbonate)glycols, e.g., poly(oxyethylenecarbonate)glycol; and glycols containing a hydrocarbon main chain e.g. hydroxy-terminated polybutadiene.

The long chain diacids include dimerized and hydrogenated ethylenically unsaturated $C_{12}$–$C_{26}$ fatty acids (such as are described in U.S. Pat. No. 3,538,009). An example of the hydrogenated dimerized acids is the dimer acid derived from linoleic acid having essentially the structure:

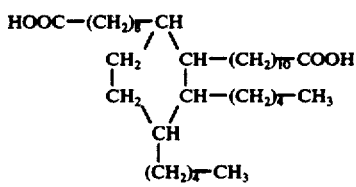

The copolyesters can be prepared by conventional polycondensation polyester-forming reactions wherein one or more short chain diacids and/or long chain diacids or their equivalents (e.g., volatile alcohol esters, acid chlorides, or anhydrides of the diacids) are caused to react with an equivalent amount of one or more short chain diols and/or long chain diols. Since copolyesters having an acid value of no more than about 2 (indicating substantially complete reaction) and relatively high molecular weight are desired, it is preferable that the polyester reaction be carried out in the presence of a suitable catalyst as discussed hereinafter. The reactions are generally carried out in the melt, however, a solvent may be utilized for azeotropic removal of the condensation by-product. It is advantageous to use a mechanical stirrer and to monitor the reaction by the increase in torque on the stirrer. On completion of the reaction, the copolyester can be removed from the reaction vessel by pouring at the final reaction temperature under an inert atmosphere.

The polycondensation reaction is facilitated by the use of excess short chain diol (e.g., an excess of from about 5 to 50 percent by weight of the total components of the polyester) which can then be removed in the final stages of the polycondensation. It is more often preferred, however, because of the low vapor pressure of some of the diols and the consequent difficulty of removal, to use only the stoichiometric amount of diol.

The choice of catalyst depends on the starting materials. Thus, for simple esterification of a short chain diacid with a short chain diol and a long chain diol, the diacid alone may function as esterification catalyst. It is preferred, however, to use as a catalyst a compound having an ionization constant greater than about $10^{-3}$, such as, for example, p-t-butylbenzenesulfonic acid. For esterification by ester interchange, an ester interchange catalyst is used. Suitable catalysts include, for example, manganous acetate, calcium acetate, zinc acetate, sodium methoxide, antimony oxide, antimony glycoxide, tetraalkyltitanates, complex titanates such as magnesium hexaalkyltitanates or other suitable ester interchange catalysts as described in the literature relating to the preparation of polyesters.

One particular method for the preparation of the copolyesters is by ester interchange involving heating in a reaction vessel the dimethyl ester of a short chain diacid with a short chain diol and a long chain diol in the presence of a suitable catalyst at 150° C. to 180° C. During the heating, methanol is distilled off (preferably in a flow of inert gas) and collected as a measure of the extent of reaction. After about three hours, approximately 75 to 90 percent of the theoretical amount of methanol will ordinarily be distilled off and a copolyester prepolymer having an inherent viscosity of less than 0.5 dl/g and an acid value of more than about 10 will have formed. The pressure of the reaction vessel is then reduced to about 5 mm (Hg) and heating is continued for 1 to 2 hours at about 200° C. Finally, the pressure is reduced to less than 1 mm and heating is continued for 3 to 5 hours at about 210° C. The copolymerization reaction is complete when the inherent viscosity of the copolyester is about 0.5 or greater, usually about 1 and the acid value is about 5 or less. It is preferable to carry out the conversion of the prepolymer to the product copolyester in the presence of an antioxidant such as sym-di-β-naphthyl-p-phenylenediamine or 1,3,5-trimethyl,2,4,6-tris(3,5-di-t-butyl-4-hydroxybenzyl)benzene or a hindered polyphenol such as those available from the Ciba-Geigy Company under the trade designations Irganox 1010 and 1076.

Further increases in the adhesion, strength and thermal stability properties of the copolyesters can be achieved by means of advancement, e.g. chain extension, for example using difunctional isocyanates such as methylene bis diphenyl diisocyanate, toluene diisocyanate, hexamethylene diisocyanate, isophorone diisocyanate, dihalosilanes such as diphenyldichlorosilane, and reacting with epoxysilanes such as β(3,4-epoxycyclohexyl)ethyltriethoxy silane,

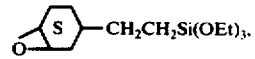

(available commercially from the Union Carbide Corporation).

As noted previously, the copolyesters are broadly useful as bonding agents. They are thermally stable in the melt, have relatively low melt viscosities and good wettability for a large variety of substrates. Of particular importance for many applications is their property of open time. Among the areas in which the copolyesters are advantageously used as bonding agents are protective coatings, surface primers, heat activated adhesives (used per se as well as in heat activated transfer tapes and fiber-reinforced adhesive films), as permanent binders (e.g., in various sheet products such as magnetic tapes) as temporary binders etc.

Protective coatings of the polymers are easily applied, are strongly adherent to a large variety of materials and are tough and stable. As surface primers they are particularly valuable used on certain materials which are normally difficult to bond, e.g., polyester surfaces such as polyethylene terephthalate. The relatively low melting polymers of the invention (including those melting down to 25° C.) have been found to be particularly useful as temporary binders in die replication and similar applications, e.g., involving the preparation of refractory molds for use in ferrous and non-ferrous metallurgy.

A particular area of utility for certain of the copolyesters of the invention is as binders in magnetic recording media which comprise a non-magnetizable backing member bearing a coating of magnetizable particles in a binder. The binders in these articles comprise copolyesters of the present invention consisting essentially of about 25 to 75 percent by weight of amorphous ester units and 75 to 25 percent by weight of crystallizable ester units in which $R_1$ is primarily tetramethylene and/or phenylene, the copolyesters having DTA melting temperatures of from about 65° to 150° C. and DTA glass transition temperatures, Tg, below 0° C. Such magnetic recording media are the subject of an application of Wayne A. Pletcher and Russell L. Vermillion referred to supra.

In tape and similar constructions, the copolyesters can be thought of as temporarily pressure sensitive adhesives (due to their open times). Thus they can be used in thermally activatable pressure sensitive tape constructions in combination with a wide variety of sheet backings including films such as polyesters including polyethylene terephthalate, cellulose acetate, ethyl cellulose, polyvinyl chloride, vinyl acetate-vinyl chloride copolymers; polyolefines such as polyethylene; polyurethanes; fibrous backings such as paper and cloth; metal foils, such as aluminum foil; foams such as urethane, polyvinyl chloride and polyolefin foams, etc.

The copolyesters can be thermally pressed into films, hot melt or extruder coated onto flexible or inflexible substrates, coated from solution, or formed into various shapes by extrusion, molding, casting, etc. Films of the copolyesters can be further processed by cold drawing and heat setting. Normally they are either solvent coated or extruded onto appropriate liners or backings for the manufacture of tapes. When used as adhesives per se, they can be hot melt coated onto substrates for bonding at the time of use. The need for low adhesion backsizes or low adhesion liners in any of the tape products of the invention (to allow the tape to be more readily unwound from the roll form) depends to a large extent on the specific copolyester used.

Several specific tape products are contemplated. One such product, which may be designated as an adhesive transfer tape, comprises a temporary laminate backing, which may be of a low adhesion material, and a film of a copolyester of the invention. Products of this type may be wound in roll form and unwound like conventional pressure sensitive adhesive tape. At the time of use, the tape is heated above the melt temperature of the copolyester. Then, while the copolyester is still open it is applied to one surface of a structure which is to be bonded and the temporary backing is removed, exposing a second tacky surface of the copolyester layer, to which a second structure is adhered. At the end of the open time of the copolyester the two structures are strongly bonded. In another type of product, a nonwoven fibrous web is included as an internal network within the copolyester layer, considerably enhancing its film strength. Likewise unlinered transfer tapes are contemplated in which a film of a copolyester of the invention is itself wound in roll form (without the temporary laminate backing). In such an article care must be taken not to heat the tape roll above the melt temperature of the polymer in order to avoid fusing the convolutions to one another.

Assuming that a reasonably high molecular weight is attained (as indicated by an inherent viscosity of at least about 0.5 dl/gm), the physical properties of the copolyesters, such as the melt temperature, the glass transition temperature, the tensile and elongation, adhesive properties, and the open time, can in general be controlled by adjustment of the amounts and nature of the constituents. Thus, in general, as the weight percent of amorphous units is increased in the copolyesters, the open time is lengthened and the melt temperature is lowered. Also, in general, the copolyesters of the longer chain aliphatic dicarboxylic acids (such as azelaic acid and sebacic acid) tend to have lower melting temperatures than those of the shorter chain dicarboxylic acids (such as adipic acid). Since the combination of properties desired will vary widely with the projected end use, a variety of chemical makeups are preferred for different products.

The copolyesters can be modified by the incorporation of fillers, pigments, dyes and other modifiers where opacity, color, increased firmness or other effects are desired. Thus, particulate alumina, titania, clay, chalk, fibrous fillers such as glass fibers, mica, graphite, aluminum, zinc, chromic oxide, phthalocyanine blue and the like may be added to alter the properties of the copolyesters.

The following non-limiting examples will illustrate the practice of the invention. Unless otherwise indicated, all parts, proportions and percentages are by weight.

The procedures for most of the tests reported in the examples have been described previously. The specific conditions for the T-peel tests were as follows: Strips of anodized aluminum (1.25 cm × 15 cm × 0.002 cm) were bonded to blocks of smooth polyvinyl chloride resin (5 cm × 13 cm × 0.4 cm) with a 0.00125 cm coating (approximately) of the copolyester being tested. In some cases T-peel tests were also run using resin surfaces other than polyvinyl chloride and those are specifically identified. The polymers of the invention generally elongate at constant tensile until they reach a yield point at about 200 percent elongation after which the tensile increases (indicating crystallinity and orientation). As noted previously, the T-peels and tensiles were run at room temperature at a jaw separation rate of about 30 cm per minute. All of the polymers of Examples 1–40 were substantially completely soluble in toluene at 25° C. in the ratio of about 10 percent by weight of copolyester to 90 percent by weight of solvent.

The following abbreviations are used in the examples. Subscript numbers following abbreviations for the glycols indicate the approximate molecular weight of the material indicated.

| AA | adipic acid |
|----|-------------|
| SA | sebacic acid |
| DA | dimer acid (hydrogenated dilinoleic acid) |
| CHD | 1,4-cyclohexanedimethanol |
| PTMEG | poly(oxytetramethylene)glycol |
| PCLD | polycaprolactonediol |
| PEG | poly(oxyethylene)glycol |
| PBD | polybutadiene |
| PECG | polyoxyethylenecarbonate glycol |

EXAMPLE 1

A copolyester of the invention having 52.0% crystallizable blocks and 48.0% amorphous blocks.

A 3-neck flask is fitted with a mechanical stirrer, a Dean-Starke trap-condenser, a thermometer, and a gas inlet for maintaining an inert atmosphere within the flask. The following are charged to the flask:

30.7 parts Adipic acid
27.2 parts 1,4-Cyclohexanedimethanol
42.1 parts Poly(oxytetramethylene)glycol (2000 molecular weight)
0.021 parts Antimony glycoxide Inert gas is introdued into the flask and the contents of the flask brought to 170° C. by means of a heated oil bath. The mixture is stirred and held at this temperature for about 3 hours. During this time, water resulting from the condensation is collected in the trap. The temperature of the mixture is reduced to about 145° C., and the pressure is then reduced to 5 to 0.25 mm Hg. These conditions are maintained for about one hour to remove additional volatile material. About 1 part of sym-di-$\beta$-naphthyl-p-phenylenediamine (an antioxidant) is then added while maintaining an inert atmosphere. The temperature of the mixture is increased to 200° to 220° C. and the pressure reduced to 0.15 mm Hg and these conditions maintained for approximately 4 hours.

The polymer solidifies to a tough, flexible, colorless, opaque material having an inherent viscosity of 0.8 dl/g, a melt temperature ($T_m$) of about 90° C., a glass transition temperature (Tg) of −82° C. and an acid number (or value) of 2.0. It has an open time of 4 minutes, a room temperature tensile strength of 135 kg/cm$^2$ and an elongation at break of 650%. The T-peel (vinyl) of this polymer is 2.9 kg/cm of width (16 pounds per inch). Strips of anodized aluminum on polystyrene and Lexan bonded by the polymer have T-peel strengths of 1.6 and 2.1 kg/cm (9 and 12 pounds per inch) respectively. A polyester prepared in a similar manner using only adipic acid and 1,4-cyclohexanedimethanol has an open time of less than one minute and does not wet vinyl, polystyrene, or Lexan resins sufficiently to provide a bond.

EXAMPLE 2

A copolyester of the invention having 43.7–47.0% crystallizable blocks and 53.0–56.3% amorphous blocks is prepared in substantially the same way from 24.9 parts of adipic acid, 24.3 parts of hydrogenated dilinoleic acid, 29.4 parts of 1,4-cyclohexanedimethanol, 21.4 parts of poly(oxytetramethylene)glycol (2000 molecular weight), 0.1 part of Irganox (antioxidant), and 0.1 part of tetrabutyltitanate (catalyst).

The polymer solidifies to a tough, flexible, colorless, opaque material having an inherent viscosity of 0.85 dl/g, a $T_m$ of about 79° C., a $T_g$ of −72° C. and an acid number of 5. It has an open time of 6 minutes, a room temperature tensile strength of 105 kg/cm$^2$ and an elongation at break of 600%. Its T-peel strength is 4.3 kg/cm of width.

The copolyesters of the remainder of the examples are prepared utilizing essentially the same process, except as otherwise specifically indicated.

EXAMPLES 3–7

Copolyesters of adipic acid, 1,4-cyclohexanedimethanol and poly(oxytetramethylene) glycol molecular weight about 2000 varying in amorphous content from about 30 to 70% and control. The compositions are:

| Example No. | Wt % Amorphous | Short Chain Diol/ Long Chain Diol Mole Ratio |
|---|---|---|
| 3 | 0 | 100/0 |
| 4 | 30.3 | 95/05 |
| 5 | 40.0 | 92.5/7.5 |
| 6 | 48.0 | 90/10 |
| 7 | 67.6 | 80/10 |

EXAMPLES 8–12

Copolyesters of adipic acid, 1,4-cyclohexanedimethanol and various polyglycols having molecular weights of approximately 1,000, the copolyesters varying in amorphous content from about 25% to about 65% and control. The compositions are:

| Example No. | Polymeric Glycol | Wt % Amorphous | Short Chain Diol/ Long Chain Diol Mole Ratio |
|---|---|---|---|
| 3 | — | 0 | 100/0 |
| 8 | PECG$_{750}$ | 27.3 | 90/10 |
| 9 | PTMEG$_{990}$ | 32.5 | 90/10 |
| 10 | PBD$_{1000}$[1] | 32.6 | 90/10 |
| 11 | PTMEG$_{990}$ | 52.2 | 80/20 |
| 12 | PTMEG$_{990}$ | 65.1 | 70/30 |

[1]A hydroxy-terminated polybutadiene having a molecular weight of about 1000 available under the trade designation "Hystl G-1000" from the Hystl Development Co.

EXAMPLES 13–18

Copolyesters of sebacic acid, cyclohexanedimethanol and long chain diols varying in amorphous content from about 10 to 30% and control. The compositions are:

| Example No. | Polymeric Glycol | Wt % Amorphous | Short Chain Diol/ Long Chain Diol Mole Ratio |
|---|---|---|---|
| 13 | — | 0 | 100/0 |
| 14 | PTMEG$_{630}$ | 11.9 | 95/05 |
| 15 | PEG$_{1000}$ | 16.4 | 95/05 |
| 16 | PTMEG$_{990}$ | 16.3 | 95/05 |
| 17 | PCLD$_{1250}$ | 19.3 | 95/05 |
| 18 | PTMEG$_{990}$ | 29.3 | 90/10 |

EXAMPLES 19–21

Copolyesters of adipic acid, cyclohexanedimethanol and hydrogenated dilinoleic acid which vary in amorphous content from about 20 to 65 percent and control. The compositions are:

| Example No. | Wt % Amorphous | AA/DA Mole Ratio |
|---|---|---|
| 3 | 0 | 100/0 |
| 19 | 22.9 | 90/10 |
| 20 | 39.9 | 80/20 |
| 21 | 64.0 | 60/40 |

EXAMPLES 22–25

Copolyesters of adipic acid, 1,4-cyclohexanedimethanol, poly(oxytetramethylene)glycol having a molecular weight of about 2000 and hydrogenated dilinoleic acid which vary in amorphous content from about 30 to 65 percent. The compositions are:

| Example No. | Wt % Amorphous | Short Chain Diol/ Long Chain Diol Mole Ratio | AA/DA Mole Ratio |
|---|---|---|---|
| 22 | 34.3–38.0 | 95/05 | 95/05 |
| 23 | 41.0–44.5 | 95/05 | 90/10 |
| 24 | 53.0–56.3[1] | 95/05 | 80/20 |
| 25 | 61.8–64.8 | 95/05 | 70/30 |

[1]The same as Example 2.

EXAMPLES 26–30

Copolyesters of azelaic acid, 1,5-pentanediol and poly(oxytetramethylene)glycol having a molecular weight of about 630, the copolyesters varying in amorphous content from about 10 to 45 percent and control. The compositions are:

| Example No. | Wt % Amorphous | Short Chain Diol/ Long Chain Diol Mole Ratio |
|---|---|---|
| 26 | 0 | 100/0 |
| 27 | 13.8 | 95/05 |
| 28 | 35.0 | 85/15 |
| 29 | 39.3 | 82.5/17.5 |
| 30 | 43.4 | 80/20 |

EXAMPLES 31–32

Two copolyesters having amorphous contents in the range of 30–34 percent. The compositions are:

| Example No. | 31 | 32 |
|---|---|---|
| Charge (parts by weight) | | |
| Adipic Acid | 32.4 | 34.5 |
| Sebacic Acid | 7.8 | 5.3 |
| Cyclohexanedimethanol | 33.9 | 34.2 |
| Poly(oxytetramethylene) glycol, m.w. 990 | 25.9 | 26.0 |
| Irganox 1010 (antioxidant) | 0.1 | 0.1 |
| AA/SA mole ratio | 85/15 | 90/10 |
| Cyclohexanedimethanol/-Poly(oxytetramethylene) glycol mole ratio | 90/10 | 90/10 |
| Weight Percent Amorphous | 31.5 | 31.8 |

The mole ratios of adipic acid to sebacic acid range from about 80/20 to 95/05 and the mole ratios of 1,4-cyclohexanedimethanol to poly(oxytetramethylene) glycol range from about 85/15 to 95/5.

EXAMPLES 33–38

Copolyesters of dimethylterephthalate, various linear (unbranched) aliphatic diols containing from six to twelve carbon atoms and poly(oxytetramethylene)-glycol having a molecular weight of about 2000, the copolyesters varying in amorphous content from about 50 to 75% by weight. The compositions are:

| Example No. | Aliphatic Diol | Wt % Amorphous | Short Chain Diol/Long Chain Diol Mole Ratio |
|---|---|---|---|
| 33 | 1,6-hexane diol | 60 | 85/15 |
| 34 | Same | 68 | 80/20 |
| 35 | Same | 74 | 75/25 |
| 36 | 1,8-octane diol | 58 | 85/15 |
| 37 | 1,10-decane diol | 55 | 85/15 |
| 38 | 1,12-didecane diol | 53 | 85/15 |

EXAMPLES 39–40

Copolyesters of dimethylsebacate, dimethylterephthalate, 1,4-cyclohexane dimethanol and poly(oxytetramethylene) glycol having a molecular weight of about 990 containing about 16 to 17 percent of amorphous units. The compositions are:

| Example No. | Dimethylsebacate/Dimethylterephthalate Mole Ratio | Short Chain Diol/Long Chain Diol Mole Ratio | Wt % Amorphous |
|---|---|---|---|
| 39 | 95/5 | 95/5 | 16.3 |
| 40 | 97.5/2.5 | 95/5 | 16.5 |

The characteristics of the copolyesters of Examples 3–40 are given in the following table:

| Example No. | Melt Temp. (°C) | Glass Transit. Temp. (°C) | Tensile (Kg/cm²) | Elong. at Break (%) | Open Time (min.) | T-peel Adhesion (Kg/cm) | Inherent Viscosity | Acid Value |
|---|---|---|---|---|---|---|---|---|
| 3 | 100 | −28 | ~250 | 400 | 0.5 | 0 | 1.01 | <5.0 |
| 4 | 93 | −76 | 210 | 500 | 2.0 | 0.9 | 0.84 | 0.7 |
| 5 | 90 | −79 | 220 | 700 | 3.0 | 3.2 | 0.95 | 2.2 |
| 6 | 90 | −82 | 135 | 650 | 4.0 | 2.9 | 0.80 | 2.0 |
| 7 | 72 | −84 | 123 | 600 | 6.0 | 2.5 | 0.81 | 2.4 |
| 8 | 82 | −44 | 175 | 500 | 2.5 | 1.8 | 1.00 | 2.9 |
| 9 | 92 | −70 | 174 | 500 | 2.5 | 1.8 | 0.95 | 3.6 |
| 10 | 92 | −26 | 175 | 500 | 3.5 | 2.3 | 0.70 | 1.5 |
| 11 | 70 | −78 | 100–150 | 500–600 | 6.0 | >1.8 | 0.81 | 3.1 |
| 12 | 58 | −82 | 100–150 | 500–600 | 7.0 | 2.1 | 0.85 | 0.7 |
| 13 | 50 | −45 | 254 | 700 | 5.0 | 0.4 | 1.00 | 1.0 |
| 14 | 49 | −57 | 188 | 600 | 5.5 | 1.8 | 0.85 | 1.8 |
| 15 | 44 | −65 | 174 | 700 | 6.5 | 3.9 | 1.00 | 1.0 |
| 16 | 47 | −64 | 181 | 750 | 6.5 | 4.1 | 1.00 | 1.0 |
| 17 | 38 | −54 | 134 | 600 | 6.5 | 2.9 | 0.80 | 2.0 |
| 18 | 45 | −70 | 145 | 850 | 9.0 | 6.8 | 1.10 | 1.5 |
| 19 | 90 | −33 | 100–200 | 400–500 | 1.5 | 0.9 | 0.75 | 0.5 |
| 20 | 77 | −39 | 100–200 | 400–500 | 4.5 | 0.9 | 0.52 | 0.5 |
| 21 | 45 | −42 | 100–200 | 400–500 | 5.5 | 0.9 | 0.70 | 0.5 |
| 22 | 96 | −76 | 254 | 650 | 3.0 | 0.9 | 1.00 | 5.0 |
| 23 | 92 | −74 | 152 | 550 | 4.0 | 1.8 | 0.80 | 5.0 |
| 24 | 79 | −72 | 105 | 600 | 6.0 | 4.3 | 0.85 | 5 |
| 25 | 65 | −68 | 100 | 400 | 10.0 | 2.1 | 0.70 | 2 |
| 26 | 45 | −70 | 100–400 | 400–1000 | 6.5 | ≧0.9 | 0.50 | 4 |
| 27 | 44 | −80 | 100–400 | 400–1000 | 10.0 | ≧0.9 | 0.50 | 5 |
| 28 | 38 | −82 | 100–400 | 400–1000 | 17.0 | ≧0.9 | 0.90 | 5 |
| 29 | 38 | −85 | 100–400 | 400–1000 | 30.0 | ≧0.9 | 0.50 | 4.1 |
| 30 | 38 | −82 | 100–400 | 400–1000 | 35.0 | ≧0.9 | 0.50 | 2.3 |
| 31 | 76 | −69 | 120 | 650 | 4.0 | ≧0.9 | 0.90 | |
| 32 | 79 | −72 | 130 | 600 | 3.5 | ≧0.9 | 0.89 | |
| 33 | 130 | −84 | 100–400 | 400–1000 | 0.25–1 | 0.9 | 0.90 | |
| 34 | 114 | −86 | 100–400 | 400–1000 | 0.25–1 | 4.1 | 0.95 | |
| 35 | 100 | −82 | 100–400 | 400–1000 | 0.25–1 | 4.4 | 0.86 | |
| 36 | 130 | −84 | 100–400 | 400–1000 | 0.25–1 | 1.8 | 0.80 | |
| 37 | 120 | −84 | 100–400 | 400–1000 | 0.25–1 | 1.8 | 0.80 | |
| 38 | 110 | −84 | 100–400 | 400–1000 | 0.25–1 | 1.8 | 0.81 | |
| 39 | 48 | −62 | 100–400 | 400–1000 | 1–7 | ≧0.9 | ≧0.50 | |
| 40 | 46 | −64 | 100–400 | 400–1000 | 1–7 | ≧0.9 | ≧0.50 | |

The copolyesters of the type of Examples 3–7 which contain from about 30–33 percent, 46–50 percent and 66–70 percent amorphous content form preferred classes as hot melt adhesives, primers (especially for use on polyethylene terephthalate films) and binders for certain sheet products respectively. The adhesion of the copolyester of Example 10 to terpolymers of acrylonitrile-butadiene-styrene terpolymers (specifically ABS-Royalite 20, available from the Uniroyal Plastic Products Division of Uniroyal, Inc. of Warsaw, Indiana) is particularly high. The copolyesters of the type of Examples 22-25 which contain from about 40 to 65 percent amorphous ester units form a preferred class. The copolyester of Example 24 (which contains about 53-57 percent amorphous units and for which the ratio of glycol to diacid content is about 3:7) is particularly preferred as an adhesive in heat activated transfer tapes due to its combination of relatively long open time and high adhesion. The copolyester of Example 34 is particularly preferred as an adhesive in heat activated transfer tapes due to its combination of open time, T-peel, adhesion and high temperature shear adhesion.

EXAMPLES 41-42

Advancement of a copolyester of sebacic acid, 1,4-cyclohexanedimethanol and poly(oxytetramethylene)-glycol having a molecular weight of approximately 630. The copolyester contains about 11 weight percent amorphous units and the short chain diol to long chain diol mole ratio is 95/05 (the same constituents as Example 14). It is prepared in the usual way and is then reacted with one percent by weight of an epoxy silane (β-3,4(epoxycyclohexyl)ethyltrimethoxysilane ("A186", Union Carbide and Carbon Corporation)). The epoxy silane (1 gm) is added dropwise over about 15 minutes to 100 g of the original copolyester in a nitrogen atmosphere at 180° C. with stirring and the mixture is allowed to react for two hours under these conditions. The properties of the original copolyester (Example 41) and the modified copolyester (Example 42) are compared in the following table.

| Example No. | 41 | 42 |
| --- | --- | --- |
| $\overline{A}_W^{(1)}$ | 1610 | 2150 |
| $\overline{A}_N^{(1)}$ | 473 | 880 |
| Ratio $\overline{A}_W/\overline{A}_N$ | 3.40 | 2.44 |
| Inherent Viscosity (dl/gm) | | |
| A) 0.5% in tetrahydrofuran | 0.59 | 0.61 |
| B) 0.3% in chloroform | 0.71 | 0.74 |
| Glass Transition Temp. (° C) | −58 | −56 |
| Melt Temperature (° C) | +42 | +42 |
| Overlap tensile$^{(2)}$, kg/cm$^2$ | 9.05 | 15.42 |
| Acid Value | 4.20 | 3.50 |

$^{(1)}\overline{A}_W$ is the weight average polymer chain length in Angstrom units. $\overline{A}_N$ is the number average polymer chain length in Angstrom units. These were determined utilizing Gel Permeation Chromatography as described in "Preparative Methods of Polymer Chemistry", Second Edition, by Sorenson and Campbell, Interscience Publishers, New York.

$^{(2)}$This tensile test is run at room temperature following the procedure of ASTM test D-1344-72 and using overlapped aluminum strips adhered over a 2.5 cm × 2.5 cm area with a 1.8 mm thick polymer sample.

EXAMPLES 43-50

Advancement of other copolyesters of the invention.

Advancement is accomplished by adding 1.0 percent by weight of isophoronediisocyanate dropwise over a period of 15 minutes to the original polyester at 180° C. with stirring and in a nitrogen atmosphere. After addition, the mixture was reacted for 2 hours under these conditions. The molecular weights of the original and advanced copolyesters are compared in the following table:

| Example No. | Composition Corresponds to | Whether Advanced | Molecular Weights $\overline{A}_W$ | $\overline{A}_N$ | Inherent Viscosities |
| --- | --- | --- | --- | --- | --- |
| 43 | Example 1 | No | 1400 | 360 | |
| 44 | Example 1 | Yes | 2200 | 450 | |
| 45 | Example 2 | No | | | 0.59 |
| 46 | Example 2 | Yes | | | 0.93 |
| 47 | Example 2 | No | | | 0.60 |
| 48 | Example 2 | Yes | | | 0.71 |
| 49 | (1) | No | 1200 | 200 | |
| 50 | (1) | Yes | 2300 | 320 | |

(1)Correspond to composition of Example 28 except using PTMEG$_{2000}$ in place of PTMEG$_{630}$.

What is claimed is:

1. A sheet backing provided on at least one major surface with a thermoplastic, coherent layer which essentially comprises a segmented copolyester capable of forming a strong, dependable bond to a substrate at a temperature below its melting temperature and without the involvement of volatiles consisting essentially of from about 5 to 75 percent by weight of amorphous ester units and 95 to 25 percent by weight of crystallizable ester units joined through ester linkages, the crystallizable ester units being of the formula:

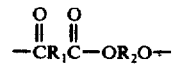

and the amorphous ester units being of the formula:

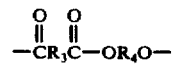

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylthioether dicarboxylic acid and 4,4'-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50-75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C., an open time of at least about ¼ minute at 20° C., substantially complete solubility in toluene at 25° C. in the ratio of about 10 percent by weight of copolyester and 90% by weight of solvent, a tensile strength of 100–400 kg/cm$^2$, an elongation at break of 400-1000 percent, a T-peel adhesion to vinyl of at least 0.9 kg/cm of width and a DTA glass transition temperature, $T_g$, below −25° C.

2. An article according to claim 1 wherein $R_4$ is $R_6$.

3. A composite tape-like product capable of being wound upon itself in roll form and subsequently unwound without delamination or transfer comprising a flexible sheet backing having adhered thereto over one major surface a thermoplastic, coherent layer which essentially comprises a segmented copolyester capable of forming a strong, dependable bond to a substrate at a temperature below its melting temperature and without the involvement of volatiles consisting essentially of from about 5 to 75 percent by weight of amorphous ester units and 95 to 25 percent by weight of crystallizable ester units joined through ester linkages, the crystallizable ester units being of the formula:

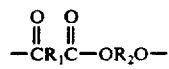

and the amorphous ester units being of the formula:

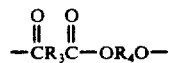

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4′-benzophenone dicarboxylic acid, 4,4′-diphenylmethane dicarboxylic acid, 4,4′-diphenylether dicarboxylic acid, 4,4′-diphenylthioether dicarboxylic acid and 4,4′-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight, the said copolyester having a DTA melting temperature of from about 25 to 150° C., an inherent viscosity of at least 0.5 dl/g at 25° C., as measured in 0.3 g/dl solutions of polymer in chloroform at 25° C., an open time of at least about ¼ minute at 20° C., substantially complete solubility in toluene at 25° C. in the ratio of about 10 percent by weight of copolyester and 90% by weight of solvent, a tensile strength of 100–400 kg/cm², an elongation at break of 400–1000 percent, a T-peel adhesion to vinyl of at least 0.9 kg/cm of width and a DTA glass transition temperature, $T_g$, below −25° C.

4. A composite tape-like product according to claim 3 wherein $R_4$ is $R_6$.

5. A composite tape-like product according to claim 3 comprising in combination a self-supporting smooth web and, releasably adhered to one face of said web, an adhesive film whereby when the adhesive is heated above its melting point, the exposed surface thereof may be adhered to a structure to be bonded, the web removed without disrupting the adhesive film, a second structure applied to the newly exposed adhesive surface and temporarily adhered thereby to the first structure and held until the adhesive has hardened to permanently bond said structures together, said adhesive film consisting essentially of a thermoplastic segmented copolyester.

6. A composite tape-like product according to claim 5 wherein the adhesive film comprises a copolyester wherein $R_1$ is the divalent radical of adipic acid, $R_2$ is the divalent radical of 1,4-cyclohexanedimethanol, $R_3$ is the divalent radical of hydrogenated dilinoleic acid, and $R_4$ is the divalent radical of poly(oxytetramethylene) glycol having a molecular weight of about 2000, the copolyester having from about 53 to 57 percent amorphous units and in which the weight ratio of glycol to diacid content is about 3:7.

7. A composite tape-like product according to claim 5 wherein the adhesive film comprises a copolyester wherein $R_1$ is the divalent radical of terephthalic acid, $R_2$ is the divalent radical of 1,6-hexanediol, $R_3$ is $R_1$ and $R_4$ is the divalent radical of poly(oxytetramethylene)-glycol having a molecaulr weight of about 2000, the copolyester having 68 percent amorphous units.

8. A fiber-reinforced thermoplastic adhesive film comprising in combination a fibrous web provided on at least one major surface with a thermoplastic segmented copolyester capable of forming a strong, dependable bond to a substrate at a temperature below its melting temperature and without the involvement of volatiles consisting essentially of from about 5 to 75 percent by weight of amorphous ester units and 95 to 25 percent by weight of crystallizable ester units joined through ester linkages, the crystallizable ester units being of the formula:

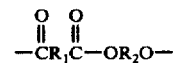

and the amorphous ester units being of the formula:

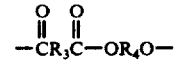

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4′-benzophenone dicarboxylic acid, 4,4′-diphenylmethane dicarboxylic acid, 4,4′-diphenylether dicarboxylic acid, 4,4′-diphenylthioether dicarboxylic acid and 4,4′-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C. and an open time of at least about ¼ minute at 20° C., substantially complete solubility in toluene at 25° C. in the ratio of about 10 percent by weight of copolyester and 90% by weight of solvent, a tensile strength of 100–400 kg/cm², an elongation at break of 400–1000 percent, a T-peel adhesion to vinyl of at least 0.9 kg/cm of width and a DTA glass transition temperature, $T_g$, below $-25°$ C.

9. An article according to claim 8 wherein $P_4$ is $R_6$.

10. A thermoplastic segmented copolyester capable of forming a strong, dependable bond to a substrate at a temperature below its melting temperature and without the involvement of volatiles consisting essentially of from about 5 to 75 percent by weight of amorphous ester units and 95 to 25 percent by weight of crystallizable ester units joined through ester linkages, the crystallizable ester units being of the formula:

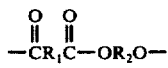

and the amorphous ester units being of the formula:

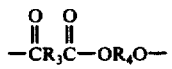

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylthioether dicarboxylic acid and 4,4'-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C., an open time of at least about ¼ minute at 20° C., substantially complete solubility in toluene at 25° C. in the ratio of about 10 percent by weight of copolyester and 90% by weight of solvent, a tensile strength of 100–400 kg/cm², an elongation at break of 400–1000 percent, a T-peel adhesion to vinyl of at least 0.9 kg/cm of width and a DTA glass transition temperature, $T_g$, below $-25°$ C.

11. A copolyester according to claim 10 having a melting temperature of from about 65° to 150° C.

12. A copolyester according to claim 10 in which $R_1$ is aliphatic.

13. A copolyester according to claim 10 in which $R_1$ is aromatic.

14. A copolyester according to claim 13 which contains at least 50 weight percent amorphous units.

15. A copolyester according to claim 10 which contains units in which $R_1$ is aliphatic and other units in which $R_1$ is aromatic.

16. A copolyester according to claim 10 wherein $R_1$ is the divalent radical of adipic acid, $R_2$ is the divalent radical of 1,4-cyclohexanedimethanol, $R_3$ is $R_1$, and $R_4$ is the divalent radical of poly(oxytetramethylene) glycols having molecular weights of about 2000, the copolyester varying in amorphous content from about 30 to 70 percent.

17. A copolyester according to claim 16 having from about 30 to 33 percent amorphous content.

18. A copolyester according to claim 16 having from about 45 to 55 percent amorphous content.

19. A copolyester according to claim 16 having from about 66–70 percent amorphous content.

20. A copolyester according to claim 10 wherein $R_1$ is the divalent radical of adipic acid, $R_2$ is the divalent radical of 1,4-cyclohexanedimethanol, $R_3$ is $R_1$ and $R_4$ is the divalent radical of polyglycols having molecular weights of about 1000, the copolyester varying in amorphous content from about 25 to 65 percent.

21. A copolyester according to claim 10 wherein $R_1$ is the divalent radical of sebacic acid, $R_2$ is the divalent radical of 1,4-cyclohexanedimethanol, $R_3$ is $R_1$ and $R_4$ is the divalent radical of polyglycols having molecular weights of from about 600 to 1300, the copolyester varying in amorphous content from about 10 to 30 percent.

22. A copolyester according to claim 10 wherein $R_1$ is the divalent radical of adipic acid, $R_2$ is the divalent radical of 1,4-cyclohexanedimethanol, $R_3$ is the divalent radical of hydrogenated dilinoleic acid and $R_4$ is $R_2$, the copolyester varying in amorphous content from about 20 to 65 percent.

23. A copolyester according to claim 10 wherein $R_1$ is the divalent radical of adipic acid, $R_2$ is the divalent radical of 1,4-cyclohexanedimethanol, $R_3$ is the divalent radical of hydrogenated dilinoleic acid and $R_4$ is the divalent radical of poly(oxytetramethylene)glycol having molecular weights of about 2000, the copolyester varying in amorphous content from about 30 to 65 percent.

24. A copolyester according to claim 23 having from about 40 to 65 percent amorphous ester units.

25. A copolyester according to claim 24 having from about 53 to 57 percent amorphous units and in which the weight ratio of glycol to diacid content is about 3:7.

26. A copolyester according to claim 10 wherein $R_1$ is the divalent radical of azelaic acid, $R_2$ is the divalent radical of 1,5-pentanediol, $R_3$ is $R_1$ and $R_4$ is the divalent radical of poly(oxytetramethylene)glycol having a molecular weight of about 630, the copolyester having from 10 to 45 percent amorphous content.

27. A copolyester according to claim 10 wherein $R_1$ consists of the divalent radicals of adipic acid and sebacic acid, $R_2$ is the divalent radical of 1,4-cyclohexanedimethanol, $R_3$ is $R_1$ and $R_4$ is the divalent radical of poly(oxytetramethylene) glycol having a molecular weight of about 990, the copolymer varying in amorphous content from about 30 to 34 percent.

28. A copolyester according to claim 27 wherein the mole ratio of adipic acid to sebacic acid radicals is from about 80/20 to 95/05 and the mole ratio of 1,4-cyclohexanedimethanol to poly(oxytetramethylene) glycol radicals is from about 85/15 to 95/5.

29. A copolyester according to claim 10 wherein $R_1$ is the divalent radical of terephthalic acid, $R_2$ is the divalent radical of a linear aliphatic diol containing from six to twelve carbon atoms, $R_3$ is $R_1$ and $R_4$ is the divalent radical of poly(oxytetramethylene) glycol having a molecular weight of about 2000, the copolyester varying in amorphous content from about 50 to 75 percent.

30. A copolyester according to claim 29 wherein $R_1$ is the divalent radical of terephthalic acid, $R_2$ is the divalent radical of 1,6-hexanediol, $R_3$ is $R_1$ and $R_4$ is the divalent radical of poly(oxytetramethylene) glycol having a molecular weight of about 2000, the copolyester varying in amorphous content from about 60 to 75 percent.

31. A copolyester according to claim 30 of 68 percent amorphous content.

32. A copolyester according to claim 10 wherein $R_1$ consists of the divalent radicals of sebacic acid and terephthalic acid, $R_2$ is the divalent radical of 1,4-cyclohexane dimethanol, $R_3$ is $R_1$ and $R_4$ is the divalent radical of poly(oxytetramethylene) glycol having a molecular weight of about 990, the copolyester containing about 16 to 17 percent of amorphous units.

33. A copolyester according to claim 10 consisting essentially of about 25 to 75 percent by weight of amorphous ester units and 75 to 25 percent by weight of crystallizable ester units in which $R_1$ is primarily tetramethylene, and/or phenylene, the copolyester having a DTA melting temperature of from about 65° to 150° C., and a DTA glass transition temperature below 0° C.

34. A copolymer according to claim 10 wherein $R_4$ is $R_6$.

* * * * *